United States Patent
Gong et al.

(10) Patent No.: US 11,649,528 B2
(45) Date of Patent: May 16, 2023

(54) COPPER BASED MICROCRYSTALLINE ALLOY, PREPARATION METHOD THEREOF, AND ELECTRONIC PRODUCT

(71) Applicant: BYD COMPANY LIMITED, Shenzhen (CN)

(72) Inventors: Qing Gong, Shenzhen (CN); Qiang Guo, Shenzhen (CN); Mengde Wang, Shenzhen (CN); Wei An, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/960,080

(22) PCT Filed: Dec. 24, 2018

(86) PCT No.: PCT/CN2018/123023
§ 371 (c)(1),
(2) Date: Jul. 4, 2020

(87) PCT Pub. No.: WO2019/134541
PCT Pub. Date: Jul. 11, 2019

(65) Prior Publication Data
US 2021/0054481 A1    Feb. 25, 2021

(30) Foreign Application Priority Data
Jan. 5, 2018 (CN) .......................... 201810011162.3

(51) Int. Cl.
*C22C 9/05* (2006.01)
*C22C 30/02* (2006.01)
*B22D 17/00* (2006.01)
*C22C 1/02* (2006.01)
*H04M 1/02* (2006.01)

(52) U.S. Cl.
CPC .............. *C22C 9/05* (2013.01); *B22D 17/007* (2013.01); *C22C 1/02* (2013.01); *C22C 30/02* (2013.01); *H04M 1/026* (2013.01)

(58) Field of Classification Search
None
See application file for complete search history.

(56) References Cited

U.S. PATENT DOCUMENTS

| 2016/0028151 A1* | 1/2016 | Tsai | H04B 1/3888 |
| | | | 343/702 |
| 2017/0349975 A1* | 12/2017 | Laws | C22C 45/00 |

FOREIGN PATENT DOCUMENTS

| CN | 1930315 A | 3/2007 |
| CN | 102634691 A | 8/2012 |
| CN | 104862524 A | 8/2015 |
| CN | 105525134 A | 4/2016 |
| EP | 1441040 A1 | 7/2004 |
| EP | 1726667 A1 | 11/2006 |
| EP | 2573198 A1 | 3/2013 |
| JP | H07138680 A | 5/1995 |
| WO | 2012104426 A2 | 8/2012 |

OTHER PUBLICATIONS

English translation of CN 105525134, EPO, accessed Aug. 2, 2021.*
English translation of CN 105525134, EPO, accessed Sep. 24, 2021.*
English translation of CN 102634691, EPO, accessed Sep. 24, 2021.*
The World Intellectual Property Organization (WIPO) International Search Report for PCT/CN2018/123023 dated Mar. 19, 2019 6 Pages.

* cited by examiner

*Primary Examiner* — Xiaobei Wang
(74) *Attorney, Agent, or Firm* — Anova Law Group, PLLC

(57) ABSTRACT

The present disclosure relates to a copper based microcrystalline alloy and a preparation method thereof, and an electronic product. In percentage by weight and based on the total amount of the copper based microcrystalline alloy, the copper based microcrystalline alloy includes: 30-60 wt % of Cu; 25-40 wt % of Mn; 4-6 wt % of Al; 10-17 wt % of Ni; 0.01-10 wt % of Si; and 0.001-0.03% of Be.

14 Claims, No Drawings

COPPER BASED MICROCRYSTALLINE ALLOY, PREPARATION METHOD THEREOF, AND ELECTRONIC PRODUCT

CROSS-REFERENCE TO RELATED APPLICATIONS

This application is the U.S. national phase entry of PCT Application No. PCT/CN2018/123023, filed Dec. 24, 2018, which is based on and claims priority to Chinese Patent Application No. 201810011162.3, filed on Jan. 5, 2018, contents of all of which are incorporated herein by reference in their entireties.

FIELD

The present disclosure relates to a copper based microcrystalline alloy and a preparation method thereof. The present disclosure also relates to an electronic product using the copper based microcrystalline alloy.

BACKGROUND

Copper alloy is a metal with good thermal conductivity, electrical conductivity, magnetic resistance and good ductility, and has a wide range of applications in electrical, aerospace, household appliances, transportation and other fields. As the requirements on precision, complexity, wear resistance and other special properties of copper alloy parts on the market are increasing, researchers have paid more and more attention to the strength, formability and machinability of copper alloy parts.

The metalization of electronic products has become a trend in the market. Electronic products, especially, smart terminals are constantly developing toward higher performance and more tactile and aesthetic appearance of industrial design to give users a new experience.

However, the corrosion resistance and mechanical strength of copper alloys are low, and the casting performance is also not satisfactory, making it difficult to meet the technical requirements of modern products.

Therefore, there is an urgent need to develop copper alloys having both good corrosion resistance and high mechanical strength and suitable for the die-casting process.

SUMMARY

To overcome the problem that copper alloys cannot provide good corrosion resistance and high mechanical strength at the same time, an objective of the present disclosure is to provide a copper based microcrystalline alloy which not only has high mechanical strength but also exhibits significantly improved corrosion resistance.

According to a first aspect of the present disclosure, the present disclosure provides a copper based microcrystalline alloy, including, in percentage by weight and based on the total amount of the copper based microcrystalline alloy:
  30-60 wt % of Cu;
  25-40 wt % of Mn;
  4-6 wt % of Al;
  10-17 wt % of Ni;
  0.01-10 wt % of Si; and
  0.001-0.03% of Be.

According to a second aspect of the present disclosure, the present disclosure provides a method for preparing the copper based microcrystalline alloy according to the first aspect of the present disclosure, the method including: smelting a copper based microcrystalline alloy raw material, followed by casting and cooling in sequence.

According to a third aspect of the present disclosure, the present disclosure provides an electronic product, including a structural part made of a material containing the copper based microcrystalline alloy according to the first aspect of the present disclosure or containing a copper based microcrystalline alloy prepared by the method according to the second aspect of the present disclosure.

The copper based microcrystalline alloy of the present disclosure not only has high mechanical strength but also exhibits significantly improved corrosion resistance.

The copper based microcrystalline alloy of the present disclosure has good fluidity and thus good formability. More importantly, the copper based microcrystalline alloy of the present disclosure can be processed by a die-casting process, which can significantly improve the surface precision (i.e., surface accuracy) of the product, and is suitable for preparing appearance decorative parts having high requirements on surface precision.

Additional aspects and advantages of the present disclosure will be partly given in and partly apparent from the description below, or understood through practice of the present disclosure.

DETAILED DESCRIPTION

The following describes embodiments of the present disclosure in detail. The embodiments described below are exemplary, and are intended to explain the present disclosure and cannot be construed as a limitation to the present disclosure.

According to a first aspect of the present disclosure, the present disclosure provides a copper based microcrystalline alloy, including, in percentage by weight and based on the total amount of the copper based microcrystalline alloy, the copper based microcrystalline alloy includes: 30-60 wt % of Cu; 25-40 wt % of Mn; 4-6 wt % of Al; 10-17 wt % of Ni; 0.01-10 wt % of Si; and 0.001-0.03% of Be.

According to the copper based microcrystalline alloy of the present disclosure, in percentage by weight and based on the total amount of the copper based microcrystalline alloy, the content of Mn is 25-40 wt %, and for example, the content of Mn is 25 wt %, 25.5 wt %, 26 wt %, 26.5 wt %, 27 wt %, 27.5 wt %, 28 wt %, 28.5 wt %, 29 wt %, 29.5 wt %, 30 wt %, 30.5 wt %, 31 wt %, 31.5 wt %, 32 wt %, 32.5 wt %, 33 wt %, 33.5 wt %, 34 wt %, 34.5 wt %, 35 wt %, 35.5 wt %, 36 wt %, 36.5 wt %, 37 wt %, 37.5 wt %, 38 wt %, 38.5 wt %, 39 wt %, 39.5 wt %, or 40 wt %. Preferably, in percentage by weight and based on the total amount of the copper based microcrystalline alloy, the content of Mn is 28-35 wt %, for example, 28.5-33 wt %.

According to the copper based microcrystalline alloy of the present disclosure, in percentage by weight and based on the total amount of the copper based microcrystalline alloy, the content of Ni is 10-17 wt %, and for example, the content of Ni is 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, or 17 wt %. In some embodiments of the present disclosure, in percentage by weight and based on the total amount of the copper based microcrystalline alloy, the content of Ni is 11-15 wt %. Preferably, in percentage by weight and based on the total amount of the copper based microcrystalline alloy, the content of Ni is 13-15 wt %.

According to the copper based microcrystalline alloy of the present disclosure, in some embodiments, to further improve the corrosion resistance and surface precision of the copper based microcrystalline alloy and further improve the formability of the copper based microcrystalline alloy, the weight ratio of Mn and Ni in the copper based microcrystalline alloy is 1.5-3.5:1, in some embodiments, the weight ratio of Mn and Ni in the copper based microcrystalline alloy is 1.8-2.5:1, in some embodiments, the weight ratio of Mn and Ni in the copper based microcrystalline alloy is 2-2.2:1.

According to the copper based microcrystalline alloy of the present disclosure, in some embodiments, in percentage by weight and based on the total amount of the copper based microcrystalline alloy, the content of Al is 4-6 wt %, for example, 4.1 wt %, 4.2 wt %, 4.3 wt %, 4.4 wt %, 4.5 wt %, 4.6 wt %, 4.7 wt %, 4.8 wt %, 4.9 wt %, 5 wt %, 5.1 wt %, 5.2 wt %, 5.3 wt %, 5.4 wt %, 5.5 wt %, 5.6 wt %, 5.7 wt %, 5.8 wt %, 5.9 wt %, or 6 wt %. When the content of Al is lower than 4 wt %, the formability of the copper based microcrystalline alloy is poor, the grain size of the copper based microcrystalline alloy is large, the mechanical strength and surface accuracy are low, and the corrosion resistance of the copper based microcrystalline alloy is not good. When the content of Al is higher than 6 wt %, the corrosion resistance and formability of the copper based microcrystalline alloy are significantly reduced, the grain size of the copper based microcrystalline alloy is large, and the surface accuracy is also significantly reduced. To further improve the surface precision, formability, and corrosion resistance of the copper based microcrystalline alloy, in percentage by weight and based on the total amount of the copper based microcrystalline alloy, the content of Al in the copper based microcrystalline alloy is preferably 4.5-5.5 wt %.

According to the copper based microcrystalline alloy of the present disclosure, in percentage by weight and based on the total amount of the copper based microcrystalline alloy, the content of Si is 0.01-10 wt %, and for example, the content of Si is 0.01 wt %, 0.05 wt %, 0.1 wt %, 0.15 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt %. Introducing Si into the copper based microcrystalline alloy can further refine the grains and improve the mechanical strength of the copper based microcrystalline alloy. Introducing Si into the copper based microcrystalline alloy can further improve the formability of the copper based microcrystalline alloy. However, when the content of Si is higher than 10 wt %, the formability of the copper based microcrystalline alloy is adversely affected, leading to a significant decrease in the formability of the copper based microcrystalline alloy, and the corrosion resistance and surface accuracy of the copper based microcrystalline alloy are also significantly reduced. According to the copper based microcrystalline alloy of the present disclosure, in percentage by weight and based on the total amount of the copper based microcrystalline alloy, in some embodiments, the content of Si is 0.05-6 wt %, and in some embodiments, the content of Si is 0.1-3 wt %.

According to the copper based microcrystalline alloy of the present disclosure, in percentage by weight and based on the total amount of the copper based microcrystalline alloy, the content of Be is 0.001-0.03 wt %, and for example, the content of Be is 0.001 wt %, 0.002 wt %, 0.003 wt %, 0.004 wt %, 0.005 wt %, 0.006 wt %, 0.007 wt %, 0.008 wt %, 0.009 wt %, 0.01 wt %, 0.011 wt %, 0.012 wt %, 0.013 wt %, 0.014 wt %, 0.015 wt %, 0.016 wt %, 0.017 wt %, 0.018 wt %, 0.019 wt %, 0.02 wt %, 0.021 wt %, 0.022 wt %, 0.023 wt %, 0.024 wt %, 0.025 wt %, 0.026 wt %, 0.027 wt %, 0.028 wt %, 0.029 wt %, or 0.03 wt %. Introducing Be into the copper based microcrystalline alloy not only can improve the fluidity and the formability of the copper based microcrystalline alloy, but also can effectively refine the grains and improve the surface precision and corrosion resistance of the copper based microcrystalline alloy. However, when the content of Be in the copper based microcrystalline alloy is higher than 0.03 wt %, the corrosion resistance and formability of the copper based microcrystalline alloy are significantly reduced, and the surface accuracy of the copper based microcrystalline alloy is adversely affected. According to the copper based microcrystalline alloy of the present disclosure, in percentage by weight and based on the total amount of the copper based microcrystalline alloy, the content of Be is 0.005-0.01 wt %.

According to the copper based microcrystalline alloy of the present disclosure, in percentage by weight and based on the total amount of the copper based microcrystalline alloy, the content of Cu is 35-57 wt %, in some embodiments, the content of Si is and more preferably 40-55 wt %.

According to the copper based microcrystalline alloy of the present disclosure, the grain size of the copper based microcrystalline alloy is small. Generally, the average grain size of the copper based microcrystalline alloy of the present disclosure is 1-6 um, and in some embodiments, the average grain size of the copper based microcrystalline alloy is 1.5-3 um. In the present disclosure, the average grain size is measured using a method specified in GB/T6394-2002.

According to the copper based microcrystalline alloy of the present disclosure, the surface roughness Ra of the copper based microcrystalline alloy is 0.2-1.5, in some embodiments, the surface roughness Ra of the copper based microcrystalline alloy is 0.25-1, in some embodiments, the surface roughness Ra of the copper based microcrystalline alloy is 0.25-0.35. In the present disclosure, the surface roughness Ra is measured using a method specified in GB/T 6458-86.

According to a second aspect of the present disclosure, the present disclosure provides a method for preparing the copper based microcrystalline alloy according to the first aspect of the present disclosure, the method including: smelting a copper based microcrystalline alloy raw material, followed by casting and cooling in sequence, to obtain the copper based microcrystalline alloy of the present disclosure; Wherein a copper based microcrystalline alloy raw material comprises: in percentage by weight and based on the total amount of the copper based microcrystalline alloy:

30-60 wt % of Cu;
25-40 wt % of Mn;
4-6 wt % of Al;
10-17 wt % of Ni;
0.01-10 wt % of Si; and
0.001-0.03% of Be.

According to the method of the present disclosure, the smelting is preferably vacuum smelting. The smelting is preferably performed at a temperature of 1100-1250° C., for example, 1100° C., 1110° C., 1120° C., 1130° C., 1140° C., 1150° C., 1160° C., 1170° C., 1180° C., 1190° C., 1200° C., 1210° C., 1220° C., 1230° C., 1240° C., or 1250° C.

The method of the present disclosure preferably further includes die-casting an alloy ingot obtained after the cooling to obtain a molded body of a desired shape.

According to the method of the present disclosure, in a preferred implementation, the die-casting is preferably semi-solid die-casting. According to this preferred implementation, the grain size of the copper based microcrystalline alloy can be further refined, thereby reducing defects in the product.

According to this preferred implementation, the semi-solid die-casting may be performed under conventional semi-solid die-casting process conditions. In some embodiments, the melting temperature is 950-990° C.; the injection speed is 0.8-2 m/s; the mold cavity temperature is 200-300° C.; the holding time is 3-5s; the first injection point may be 145-150 mm; and the second injection point may be 190-195 mm. For example, the melting temperature is 950° C., 955° C., 960° C., 965° C., 970° C., 975° C., 980° C., 985° C. or 990° C.; the injection speed is 0.8 m/s, 0.9 m/s, 1.0 m/s, 1.1 m/s, 1.2 m/s, 1.3 m/s, 1.4 m/s, 1.5 m/s, 1.6 m/s, 1.7 m/s, 1.8 m/s, 1.9 m/s or 2.0 m/s; the mold cavity temperature is 200° C., 210° C., 220° C., 230° C., 240° C., 250° C., 260° C., 270° C., 280° C., 290° C. or 300° C.; the holding time is 3s, 3.5s, 4.0s, 4.5s or 5s; the first injection point is 145 mm, 146 mm, 147 mm, 148 mm, 149 mm or 150 mm; and the second injection point is 190 mm, 191 mm, 192 mm, 193 mm, 194 mm or 195 mm.

The copper based microcrystalline alloy of the present disclosure not only has good mechanical properties and good corrosion resistance, but also can be molded by die-casting to fabricate an article with good surface precision and therefore is suitable for fabricating a structural part of an electronic product.

Based on this, according to a third aspect of the present disclosure, the present disclosure provides an electronic product, including a structural part made of a material containing the copper based microcrystalline alloy according to the first aspect of the present disclosure or containing a copper based microcrystalline alloy prepared by the method according to the second aspect of the present disclosure.

According to the electronic product of the present disclosure, the structural part is preferably an appearance part.

According to the electronic product of the present disclosure, the electronic product is preferably a mobile phone. The microcrystalline alloy of the present disclosure may be used for fabricating an appearance frame of a mobile phone. In a preferred implementation, a middle frame of the mobile phone is made of a material containing the copper based microcrystalline alloy of the present disclosure.

Hereinafter, the present disclosure will be described in detail by way of examples; however, the scope of the present disclosure is not limited thereto.

The following test methods are involved in the embodiments and comparative examples below.

(1) Surface Roughness Test

The surface roughness was measured using a method specified in GB/T 1031-1995.

(2) Corrosion Resistance Test

The corrosion resistance test of the copper based microcrystalline alloy was measured using a method specified in GB/T 6458-86.

(3) Tensile Strength Test

The tensile strength of the copper based microcrystalline alloy was measured using a method specified in GB/T 228.1-2010 "Metallic materials—Tensile testing—Part 1: Method of test at room temperature".

(4) Hardness Test

A Vickers hardness test was performed on the polished test surface according to GB/T4340.4-2009 "Metallic materials—Vickers hardness test—Part 4: Tables of hardness values", where the test force was 10 kg, and an average value of five measurement points was calculated.

(5) Average Grain Size Test

The average grain size of the copper based microcrystalline alloy was measured using a method specified in GB/T6394-2002.

(6) Fluidity Test

A single spiral fluidity sample mold was used, where the cross-sectional size was 5.5 mm×3 mm, the pouring capacity was 45 cm$^3$, and the injection speed was 1 m/s.

(7) Formability Test

The formability test was performed using a mobile phone middle frame die-casting integrity method.

"Excellent" means that the outer surface of the middle frame is bright and is completely formed, with all detailed structures being completely formed, without breakage or mold sticking.

"Good" means that the outer surface of the middle frame is bright and is completely formed, with all detailed structures being completely formed, without breakage.

"Fair" means that the middle frame is completely formed, with all detailed structures being completely formed, without breakage.

"Bad" means that the middle frame is completely formed, but some detailed structures are not formed.

"Very bad" means that the middle frame is not completely formed, and some detailed structures are not formed.

The present disclosure is described with reference to Examples 1-13.

Embodiment 1

A copper based microcrystalline alloy raw material was formulated according to the composition of Table 1. The copper based microcrystalline alloy raw material was vacuum smelted. The vacuum smelting process was: using a vacuum smelting furnace, evacuating to 5 Pa or below and introducing argon gas, preheating the furnace body at 20 kW for 5 min, heating to 1120° C. at 50-60 kW, holding for 8 min, and then casting into an ingot.

After the obtained ingot is melted, semi-solid die-casting was performed on a cold-chamber die-casting machine DCC160 to obtain a die-cast body of the copper based microcrystalline alloy of the present disclosure. Conditions of semi-solid die-casting include: the melting temperature is 950° C.; the injection speed is 0.9 m/s; the mold cavity temperature is 250° C.; the holding time is 3s; the first injection point is 150 mm; and the second injection point is 195 mm.

Property parameters of the prepared copper based microcrystalline alloy are listed in Table 2.

Embodiments 2-3

A copper based microcrystalline alloy was prepared using the same method as described in Embodiment 1, except that a copper based microcrystalline alloy raw material was formulated according to the composition given in Table 1. Property parameters of the prepared copper based microcrystalline alloy are listed in Table 2.

In Embodiment 2, conditions of semi-solid die-casting include: the melting temperature is 950° C.; the injection speed is 1.0 m/s; the mold cavity temperature is 250° C.; the holding time is 3s; the first injection point is 145 mm; and the second injection point is 195 mm.

In Embodiment 3, conditions of semi-solid die-casting include: the melting temperature is 960° C.; the injection speed is 1.2 m/s; the mold cavity temperature is 195° C.; the holding time is 3s; the first injection point is 145 mm; and the second injection point is 195 mm.

Embodiments 4, 5 and 13

A copper based microcrystalline alloy was prepared using the same method as described in Embodiment 1, except that a copper based microcrystalline alloy raw material was formulated according to the composition given in Table 1. Property parameters of the prepared copper based microcrystalline alloy are listed in Table 2.

Embodiments 6, 7 and 10-12

A copper based microcrystalline alloy was prepared using the same method as described in Embodiment 2, except that a copper based microcrystalline alloy raw material was formulated according to the composition given in Table 1. Property parameters of the prepared copper based microcrystalline alloy are listed in Table 2.

Embodiments 8 and 9

A copper based microcrystalline alloy was prepared using the same method as described in Embodiment 3, except that a copper based microcrystalline alloy raw material was formulated according to the composition given in Table 1. Property parameters of the prepared copper based microcrystalline alloy are listed in Table 2.

Comparative Examples 1-5, 9 and 10

A copper based microcrystalline alloy was prepared using the same method as described in Embodiment 1, except that a copper based microcrystalline alloy raw material was formulated according to the composition of Table 1. Property parameters of the prepared copper based microcrystalline alloy are listed in Table 2.

Comparative Examples 6-7

A copper based microcrystalline alloy was prepared using the same method as described in Embodiment 3, except that a copper based microcrystalline alloy raw material was formulated according to the composition of Table 1. Property parameters of the prepared copper based microcrystalline alloy are listed in Table 2.

Comparative Examples 8 and 11

A copper based microcrystalline alloy was prepared using the same method as described in Embodiment 2, except that a copper based microcrystalline alloy raw material was formulated according to the composition of Table 1. Property parameters of the prepared copper based microcrystalline alloy are listed in Table 2.

TABLE 1

Compositions of copper based microcrystalline alloys in Embodiments 1-13 and Comparative Examples 1-11 (in weight percent in percentage by weight and based on the total amount of the copper based microcrystalline alloy)

| No. | Cu | Mn | Al | Ni | Si | Be |
|---|---|---|---|---|---|---|
| Embodiment 1 | 53.395 | 28.5 | 5 | 13 | 0.1 | 0.005 |
| Embodiment 2 | 48.495 | 30 | 5.5 | 15 | 1 | 0.005 |
| Embodiment 3 | 44.49 | 33 | 4.5 | 15 | 3 | 0.01 |
| Embodiment 4 | 53.37 | 28.5 | 5 | 13 | 0.1 | 0.03 |
| Embodiment 5 | 53.399 | 28.5 | 5 | 13 | 0.1 | 0.001 |
| Embodiment 6 | 43.495 | 30 | 5.5 | 15 | 6 | 0.005 |
| Embodiment 7 | 49.485 | 30 | 5.5 | 15 | 0.01 | 0.005 |
| Embodiment 8 | 42.99 | 33 | 6 | 15 | 3 | 0.01 |
| Embodiment 9 | 44.99 | 33 | 4 | 15 | 3 | 0.01 |
| Embodiment 10 | 48.495 | 28 | 5.5 | 17 | 1 | 0.005 |
| Embodiment 11 | 48.495 | 35 | 5.5 | 10 | 1 | 0.005 |
| Embodiment 12 | 38.495 | 40 | 5.5 | 15 | 1 | 0.005 |
| Embodiment 13 | 56.895 | 25 | 5 | 13 | 0.1 | 0.005 |
| Comparative Example 1 | 60.7 | 25 | 4.3 | 10 | 0 | 0 |
| Comparative Example 2 | 53.495 | 28.5 | 5 | 13 | 0 | 0.005 |
| Comparative Example 3 | 53.4 | 28.5 | 5 | 13 | 0.1 | 0 |
| Comparative Example 4 | 53.35 | 28.5 | 5 | 13 | 0.1 | 0.05 |
| Comparative Example 5 | 41.495 | 28.5 | 5 | 13 | 12 | 0.005 |
| Comparative Example 6 | 38.99 | 33 | 10 | 15 | 3 | 0.01 |
| Comparative Example 7 | 47.99 | 33 | 1 | 15 | 3 | 0.01 |
| Comparative Example 8 | 33.495 | 45 | 5.5 | 15 | 1 | 0.005 |
| Comparative Example 9 | 61.895 | 20 | 5 | 13 | 0.1 | 0.005 |
| Comparative Example 10 | 58.395 | 28.5 | 5 | 8 | 0.1 | 0.005 |
| Comparative Example 11 | 43.495 | 30 | 5.5 | 20 | 1 | 0.005 |

TABLE 2

Performance of copper based microcrystalline alloys obtained in Embodiments 1-13 and Comparative Examples 1-11

| No. | Average grain size (μm) | Hardness (HV) | Tensile strength (MPa) | Roughness (Ra) | Corrosion rate (mm/a) | Fluidity (mm) | Formability |
|---|---|---|---|---|---|---|---|
| Embodiment 1 | 2.3 | 300 | 950 | 0.31 | 0.0255 | 1550 | Excellent |
| Embodiment 2 | 3 | 288 | 925 | 0.25 | 0.0518 | 1500 | Excellent |
| Embodiment 3 | 1.5 | 315 | 1000 | 0.22 | 0.0348 | 1550 | Excellent |
| Embodiment 4 | 4.5 | 299 | 930 | 0.35 | 0.0150 | 1450 | Good |
| Embodiment 5 | 3.2 | 305 | 962 | 0.52 | 0.0522 | 1400 | Good |
| Embodiment 6 | 2 | 320 | 1100 | 0.36 | 0.2541 | 1430 | Good |
| Embodiment 7 | 3.8 | 270 | 900 | 0.3 | 0.0675 | 1400 | Good |
| Embodiment 8 | 5.2 | 250 | 750 | 0.21 | 0.5568 | 1350 | Good |
| Embodiment 9 | 3.2 | 280 | 929 | 0.51 | 0.2648 | 1300 | Ordinary |
| Embodiment 10 | 4.2 | 303 | 905 | 0.52 | 0.1567 | 1350 | Ordinary |
| Embodiment 11 | 2.7 | 298 | 899 | 0.55 | 0.0564 | 1400 | Good |
| Embodiment 12 | 2 | 300 | 920 | 0.63 | 0.0834 | 1350 | Ordinary |
| Embodiment 13 | 3.5 | 285 | 830 | 0.45 | 0.0356 | 1450 | Good |
| Comparative Example 1 | 6.8 | 242 | 725 | 0.31 | 0.124 | 1250 | Bad |
| Comparative Example 2 | 5.6 | 230 | 720 | 0.31 | 0.0325 | 1450 | Bad |

TABLE 2-continued

Performance of copper based microcrystalline alloys obtained in Embodiments 1-13 and Comparative Examples 1-11

| No. | Average grain size (μm) | Hardness (HV) | Tensile strength (MPa) | Roughness (Ra) | Corrosion rate (mm/a) | Fluidity (mm) | Formability |
|---|---|---|---|---|---|---|---|
| Comparative Example 3 | 5.1 | 280 | 980 | 0.53 | 0.122 | 1450 | Bad |
| Comparative Example 4 | 3.7 | 293 | 910 | 0.43 | 0.157 | 1450 | Bad |
| Comparative Example 5 | 1.9 | 350 | 1150 | 0.87 | 0.9998 | 1150 | Very bad |
| Comparative Example 6 | 12 | 265 | 800 | 4.22 | 2.4555 | 1100 | Very bad |
| Comparative Example 7 | 13.2 | 255 | 756 | 5.18 | 1.2332 | 1250 | Bad |
| Comparative Example 8 | 3.3 | 321 | 980 | 0.83 | 0.114 | 1150 | Very bad |
| Comparative Example 9 | 7.5 | 270 | 825 | 0.68 | 0.0564 | 1310 | Ordinary |
| Comparative Example 10 | 8.5 | 240 | 732 | 0.77 | 0.0531 | 1250 | Bad |
| Comparative Example 11 | 9.7 | 260 | 801 | 0.21 | 0.0231 | 1100 | Very bad |

It can be seen from Table 2 that the copper based microcrystalline alloy of the present disclosure not only has high mechanical strength but also has good corrosion resistance and formability. The copper based microcrystalline alloy of the present disclosure can be molded by die-casting to fabricate an article with significantly improved surface precision.

It can be seen through comparison between Embodiment 1 and Comparative Examples 1-3 that introducing Si and Be into the copper based microcrystalline alloy of the present disclosure can effectively refine the grains, improve the mechanical strength and surface precision of the article, improve the corrosion resistance, and improve the fluidity of the melt, thereby improving the formability.

It can be seen through comparison between Embodiment 1 and Comparative Example 4 that when the content of Be in the alloy is too high, the corrosion resistance and formability of the copper based microcrystalline alloy are significantly reduced.

It can be seen through comparison between Embodiment 1 and Comparative Example 5 that when the content of Si in the alloy is too high, the surface precision, formability and corrosion resistance of the copper based microcrystalline alloy are significantly reduced.

It can be seen through comparison between Embodiment 3 and Comparative Example 6 that when the content of Al in the alloy is too high or too low, not only the grain size of the copper based microcrystalline alloy is too large, leading to degraded mechanical properties and reduced surface precision and corrosion resistance of the copper based microcrystalline alloy, but also the formability of the copper based microcrystalline alloy is adversely affected.

It can be seen by comparing Embodiment 2 and 12 with Comparative Example 8, and comparing Embodiment 1 and 13 with Comparative Example 9, that when the content of Mn in the alloy is too high or too low, the surface precision and corrosion resistance of the copper based microcrystalline alloy are reduced, and the formability of the copper based microcrystalline alloy is adversely affected. Especially when the content of Mn is too high, the formability of the copper based microcrystalline alloy is severely degraded.

It can be seen through comparison between Embodiment 1 and Comparative Example 10 that when the content of Ni in the alloy is too low, the grain size of the alloy is too large, leading to reduced mechanical properties and surface precision of the copper based microcrystalline alloy, and the formability of the copper based microcrystalline alloy is also reduced. It can be seen through comparison between Embodiment 2 and Comparative Example 11 that when the content of Ni in the alloy is too high, not only the grain size of the copper based microcrystalline alloy is too large, leading to degraded mechanical properties, but also the formability of the copper based microcrystalline alloy is significantly reduced.

The preferred embodiments of the present disclosure are described in detail above, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, the various embodiments of the present disclosure may be combined without departing from the idea of the present disclosure, and such combinations shall also fall within the scope of the present disclosure.

In the description of the specification, the description with reference to the terms "an embodiment", "some embodiments", "example", "specific example", or "some example" and so on means that specific features, structures, materials or characteristics described in connection with the embodiment or example are embraced in at least one embodiment or example of the present disclosure. In the present specification, the illustrative expression of the above terms is not necessarily referring to the same embodiment or example. Moreover, the described specific features, structures, materials or characteristics may be combined in any suitable manners in one or more embodiments. In addition, where there are no contradictions, the various embodiments or examples described in this specification and features of various embodiments or examples can be combined by those skilled in the art.

Although the embodiments of the present disclosure have been illustrated and described above, it is to be understood that the above embodiments are exemplary and not to be construed as limiting the present disclosure, and that changes, modifications, substitutions and alterations can be made by those skilled in the art without departing from the scope of the present disclosure.

What is claimed is:

1. A copper-based-microcrystalline-alloy, comprising, in percentage by weight and based on a total amount of the copper-based-microcrystalline-alloy:
   30-60 wt % of Cu;
   25-40 wt % of Mn;
   4-6 wt % of Al;
   10-17 wt % of Ni;
   0.01-10 wt % of Si; and
   0.001-0.03% of Be,
   wherein an average grain size of the copper-based-microcrystalline-alloy is 1-6 μm.

2. The copper-based-microcrystalline-alloy according to claim 1, wherein in percentage by weight and based on the total amount of the copper-based-microcrystalline-alloy, the Mn is 28-35 wt %.

3. The copper-based-microcrystalline-alloy according to claim 1, wherein in percentage by weight and based on the total amount of the copper-based-microcrystalline-alloy, the Ni is 11-15 wt %.

4. The copper-based-microcrystalline-alloy according to claim 1, wherein a ratio of a weight of Mn to a weight of Ni in the copper-based-microcrystalline-alloy is 1.5-3.5:1.

5. The copper-based-microcrystalline-alloy according to claim 1, wherein a ratio of a weight of Mn to a weight of Ni in the copper-based-microcrystalline-alloy is 1.8-2.5:1.

6. The copper-based-microcrystalline-alloy according to claim 1, wherein a ratio of a weight of Mn to a weight of Ni in the copper-based-microcrystalline-alloy is 2-2.2:1.

7. The copper-based-microcrystalline-alloy according to claim 1, wherein in percentage by weight and based on the total amount of the copper-based-microcrystalline-alloy, the Al is 4.5-5.5 wt %.

8. The copper-based-microcrystalline-alloy according to claim 1, wherein in percentage by weight and based on the total amount of the copper-based-microcrystalline-alloy, the Si is 0.05-6 wt %.

9. The copper-based-microcrystalline-alloy according to claim 1, wherein in percentage by weight and based on the total amount of the copper-based-microcrystalline-alloy, the Be is 0.005-0.01 wt %.

10. The copper-based-microcrystalline-alloy according to claim 1, wherein in percentage by weight and based on the total amount of the copper-based-microcrystalline-alloy, the Cu is 35-57 wt %.

11. The copper-based-microcrystalline-alloy according to claim 1, wherein a surface roughness Ra of the copper-based-microcrystalline-alloy is 0.2-1.5 microns.

12. An electronic product, comprising a structural part made of a material containing the copper-based-microcrystalline-alloy according to claim 1.

13. The electronic product according to claim 12, wherein the structural part is an appearance part.

14. The electronic product according to claim 12, wherein the electronic product comprises a mobile phone or a middle frame of a mobile phone.

* * * * *